(12) United States Patent
Okada et al.

US008495802B2

(10) Patent No.: US 8,495,802 B2
(45) Date of Patent: Jul. 30, 2013

(54) CLIP

(75) Inventors: Shigeo Okada, Kanagawa (JP); Takeshi Nakajima, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 315 days.

(21) Appl. No.: 12/385,882

(22) Filed: Apr. 22, 2009

(65) Prior Publication Data

US 2009/0265900 A1    Oct. 29, 2009

(30) Foreign Application Priority Data

Apr. 25, 2008  (JP) ................................ P2008-115219
Aug. 1, 2008  (JP) ................................ P2008-200026

(51) Int. Cl.
*F16B 21/00*  (2006.01)
*F16B 5/06*  (2006.01)

(52) U.S. Cl.
USPC .............. 24/297; 24/581.11; 24/453; 24/458; 411/508

(58) Field of Classification Search
USPC ................. 24/297, 326, 453, 458; 411/104, 411/508, 509
See application file for complete search history.

(56) References Cited

U.S. PATENT DOCUMENTS

| | | | |
|---|---|---|---|
| 3,678,797 A * | 7/1972 | Seckerson | 85/5 R |
| 3,988,808 A * | 11/1976 | Poe et al. | 24/326 |
| 4,668,145 A | 5/1987 | Hirohata et al. | |
| 4,987,656 A * | 1/1991 | Sato | 24/297 |
| 5,173,026 A | 12/1992 | Cordola et al. | |
| 5,319,839 A * | 6/1994 | Shimajiri | 24/453 |
| 5,573,362 A * | 11/1996 | Asami et al. | 411/509 |
| 5,592,719 A * | 1/1997 | Eto et al. | 24/453 |
| 5,704,753 A * | 1/1998 | Ueno | 411/509 |
| 5,857,244 A * | 1/1999 | Edwards et al. | 24/297 |
| 6,305,055 B1 * | 10/2001 | Castro | 24/458 |

(Continued)

FOREIGN PATENT DOCUMENTS

| | | |
|---|---|---|
| JP | 62-017410 A | 1/1987 |
| JP | 5-071519 A | 3/1993 |

(Continued)

OTHER PUBLICATIONS

Chinese Office Action dated Mar. 23, 2012, with English-language translation.

(Continued)

*Primary Examiner* — Robert J Sandy
*Assistant Examiner* — David Upchurch
(74) *Attorney, Agent, or Firm* — McGinn IP Law Group, PLLC

(57) ABSTRACT

According to an aspect of the present invention, there is provided a clip including: a flange to be abutting a panel having an attaching hole; and a leg portion to be inserted into the attaching hole. The leg portion includes: an engaging part; and a guide part connected thereto. The guide part include: a distal-end tapered part formed to be gradually reduced in an outer diameter toward an inserting direction of the leg portion; a base-end reversely tapered part formed to be gradually reduced in an outer diameter toward the opposite direction; and a diameter enlarged part formed therebetween to have an outer diameter largest among the guide part. The largest outer diameter of the diameter enlarged part is larger than that of a distal end part of the engaging part.

19 Claims, 14 Drawing Sheets

U.S. PATENT DOCUMENTS

| | | | |
|---|---|---|---|
| 6,916,145 B2 * | 7/2005 | Lydan | 411/510 |
| 7,033,121 B2 * | 4/2006 | Kirchen | 411/48 |
| 7,862,272 B2 | 1/2011 | Nakajima | |
| 2002/0028123 A1 * | 3/2002 | Miura et al. | 411/508 |
| 2002/0106261 A1 * | 8/2002 | Nakanishi | 411/508 |
| 2004/0052612 A1 * | 3/2004 | Miura | 411/508 |
| 2005/0095084 A1 * | 5/2005 | Hansen | 411/508 |

FOREIGN PATENT DOCUMENTS

| | | |
|---|---|---|
| JP | 2571374 | 5/1998 |
| JP | 10-238522 A | 9/1998 |
| JP | 2001-182725 A | 7/2001 |
| JP | 2005-076648 | 3/2005 |
| JP | 2006-200611 A | 8/2006 |
| WO | WO 2005-116460 A1 | 12/2005 |

OTHER PUBLICATIONS

Japanese Notification of Reasons for Refusal dated Apr. 3, 2012, with English-language translation.

* cited by examiner

CLIP

CROSS-REFERENCE TO RELATED APPLICATIONS

This application claims priority from Japanese Patent Application No. 2008-115219 filed on Apr. 25, 2008, and from Japanese Patent Application No. 2008-200026 filed on Aug. 1, 2008, the entire contents of which are incorporated herein by reference.

BACKGROUND OF THE INVENTION

1. Field of the Invention

An aspect of the present invention relates to a clip to be inserted and fixed to an attaching hole formed in parts such as a vehicle body panel or the like.

2. Description of the Related Art

When mounting parts such as a trim board are attached to parts such as a vehicle body panel of a motor vehicle, a clip is used.

As such clip, JP-2005-076648-A discloses a two-color molded clip. The two-color molded clip includes a primary molded portion and a secondary molded portion. The primary molded portion has a flange-shaped engaging part, a seat part and a support connecting them for fixedly holding an attaching member and an engaging part connected thereto for being inserted and fixed to the hole of an attached-side member. The secondary molded portion has a skirt shaped stabilizer connected to the seat part at a side of the engaging part. The primary molded portion that has been molded is set in a metal mold for the secondary molded portion, thereby forming the secondary molded portion integrally with the primary molded portion.

In the end of the engaging part, a tapered block part is formed to have a diameter enlarged toward the seat part, and a plurality of flexible engaging pieces are extended from a peripheral edge of a base end part of the block part at a position where a diameter is maximally enlarged. When the clip is fixed to the attaching hole of the attached-side member, the tapered block part is pushed into the attaching hole. When the block part passes through the attaching hole, the engaging pieces entering thereinto are pressed by the inner periphery of the attaching hole while being slightly bent. When the stepped holding parts of the base end parts of the engaging pieces reach the back side of the attaching hole, the plurality of the engaging pieces are elastically restored so that the holding parts are engaged with the peripheral edge of the attaching hole from the back side, and the clip is fixed to the attaching hole.

For example, when the attaching hole to which the clip is to be attached is provided on a vehicle body panel used for a motor vehicle by a punching molding method, burrs rising from the peripheral edge of the attaching hole are occasionally formed. When the clip disclosed in JP-2005-076648-A is inserted into the attaching hole having such burrs formed under a state that a pushing position of the leg portion of the clip is not aligned with the attaching hole, after the block part of the end part passes through the attaching hole, the burs may occasionally powerfully butt against and byte into the outer peripheries of the end parts of the engaging pieces. Since the clip is inserted while the outer peripheral surfaces of the end parts of the engaging pieces is scraped off, the outer peripheral surfaces of the end parts of the engaging pieces are seriously damaged. As a result, after the engaging pieces pass through the attaching hole, the engaging pieces may not be elastically restored, and the engaging force of the clip to the attaching hole may be occasionally deteriorated.

Further, in the clip disclosed in JP-2005-076648-A, since small stepped parts are formed between the tapered block part and the engaging pieces extended from the block part, when the clip is pulled out from the attaching hole to detach the clip therefrom, the stepped parts may be occasionally caught on the peripheral edge of the attaching hole. Thus, the clip may be sometimes hardly detached from the attaching hole.

SUMMARY OF THE INVENTION

One of objects of the present invention is to provide a clip that can suppress the damage of a part to be engaged with an attaching hole when the clip is inserted into the attaching hole and can be smoothly detached from the attaching hole.

In order to achieve the above-described object, according to a first aspect of the present invention, there is provided a clip including: a flange configured to abut a panel having an attaching hole from a front side thereof; and a leg portion configured to extend from one surface of the flange so as to be inserted into the attaching hole, wherein the leg portion includes: an engaging part configured to engage with a back side of the panel; and a guide part connected to a distal end of the engaging part, wherein the guide part include: a tapered part formed at a distal end thereof so as to be gradually reduced in an outer diameter toward an inserting direction of the leg portion; a reversely tapered part formed at a base end thereof so as to be gradually reduced in an outer diameter toward an opposite direction of the inserting direction; and a diameter enlarged part formed between the reversely tapered part and the tapered part so as to have an outer diameter largest among the guide part, and wherein the largest outer diameter of the diameter enlarged part is formed to be larger than that of a distal end part of the engaging part.

According to the above-described structure, even when the leg portion is pushed into the attaching hole under a state that the pushing position of the leg portion is not aligned with the attaching hole, the tapered part of the guide part abuts on the inner peripheral edge of the attaching hole so that the leg portion is guided and pushed into the attaching hole. When the diameter enlarged part gets over and passes through the attaching hole, the outer peripheral surface of the engaging part in the base side butts against the peripheral edge of the attaching hole via the end part of the engaging part. Further, when the leg portion is further pushed into attaching hole, the engaging part is engaged with the back side of the attaching hole and the flange is engaged with the front side to fix the clip to the attaching hole.

In this clip, when the leg portion is inserted into the attaching hole as described above, since after the diameter enlarged part passes through the attaching part, the end part of the engaging part does not butt against the attaching hole and the leg portion is inserted into the attaching hole via the end part of the engaging part, the end part of the engaging part or a part near the end part can be protected and a damage or a loss can be assuredly prevented. As a result, for instance, when the engaging part is provided with elastic engaging pieces capable of being flexibly bent during the insertion of the leg portion into the attaching hole, since the end part serving as a starting point of a bending deformation is protected, the bending force or the elastic restoring force of the elastic engaging pieces can be maintained and the securing force of the engaging part to the attaching hole can be held.

Further, when the flexible elastic engaging pieces are provided as described above, since the attaching hole does not abut on the end part that is hardly flexibly bent during the insertion of the leg portion into the attaching hole, the leg portion can be smoothly inserted into the attaching hole with a relatively small insertion resistance, so that an attaching workability can be improved.

Further, since the tapered part whose diameter is reduced gradually toward the inserting direction of the leg portion to the attaching hole is provided in the outer periphery of the end side of the guide part, even when burrs rise in the peripheral edge of the front side of the attaching hole, the leg portion is not caught thereby and can be smoothly inserted into the attaching hole.

Further, since the reversely tapered part whose diameter is reduced gradually toward the opposite direction to the inserting direction of the leg portion to the attaching hole is provided in the outer periphery of the base side of the guide part, when the clip fixed to the attaching hole is detached from the attaching hole because of some reason, the guide part is not caught by the attaching hole and the leg portion can be smoothly pulled out so that the clip can be easily detached from the attaching hole.

According to a second aspect of the present invention, there is provided the clip, wherein an axial distance from a base end part of the guide part to a position where an outer diameter of the engaging part becomes largest is X, wherein an axial distance from the base end part of the guide part to a position where the outer diameter of the engaging part becomes equal to that of the diameter enlarged part is Y, and wherein there is satisfied that Y>X/3.

According to the above-described structure, since the maximum outside diameter of the diameter enlarged part of the guide part is set as described above, the axial distance to the outer peripheral surface of the engaging part that butts against the peripheral edge of the attaching hole can be sufficiently ensured after the guide part passes through the attaching hole. For instance, even when the leg portion is inserted slantwise to the attaching hole, the end part of the engaging part and a wide range near the end part of the engaging part can be protected so as not to abut on the peripheral edge of the attaching hole.

According to a third aspect of the present invention, there is provided the clip, wherein the guide part is formed to be solid.

According to the above-described structure, since the guide part is formed to be solid, even when the burrs rise in the peripheral edge of the front side of the attaching hole, the guide part can be more assuredly prevented from biting and being hooked on the attaching hole and the leg portion can be smoothly inserted into the attaching hole.

According to a fourth aspect of the present invention, there is provided the clip, wherein the engaging part includes: a post extending from a center of the one surface of the flange; a plurality of ribs radial-outwardly extending from outer peripheries of the post; and a plurality of elastic engaging pieces circumferentially extending from ends of the ribs so as to be engaged with the back side of the panel.

According to the above-described structure, since the elastic engaging pieces are connected to the ribs extending from the post shaped part and have structures that are relatively easily bent, even when the axial length of the engaging part is reduced, the elastic engaging pieces can be sufficiently bent. That is, since the engaging part can be formed to be short, even when the guide part is connected to the end of the engaging part, the entire length of the clip can be relatively decreased.

According to a fifth aspect of the present invention, there is provided the clip, wherein the four ribs and the four elastic engaging pieces are formed on the post so as to be respectively arranged at equal intervals in a circumferential direction of the post, wherein a pair of side trimming grooves are formed between the post and each of one opposing pair of the elastic engaging pieces, wherein a pair of axial trimming grooves are formed between the post and each of the other opposing pair of the elastic engaging pieces and formed to extend through the guide part along an axial direction of the post, the axial trimming grooves being flattened out at the guide portion, and wherein the elastic engaging pieces are flexibly bendable in a radial direction through the trimming grooves.

According to the above-described structure, since the four ribs and elastic engaging pieces are respectively arranged at equal intervals in the circumferential direction of the post shaped part and the four elastic engaging pieces are equally engaged with the attaching hole in the circumferential direction, the clip can be strongly fixed to the attaching hole with good balance.

Further, the pair of side trimming grooves are formed by a die sliding in the direction at right angles to the axial direction of the post shaped part, so that the pair of elastic engaging pieces opposed to each other in the circumferential direction can be formed. The pair of axial trimming grooves are formed by a die sliding in the axial direction of the post shaped part, so that the other pair of elastic engaging pieces opposed to each other in the circumferential direction can be formed. Thus, the structure of a molding die can be simplified.

Further, the guide part is partly cut out by the axial trimming grooves, however, other part is not cut out. Since only the cut out parts necessary as small as a minimum are provided, even when the leg portion is inserted into the attaching hole in which the burs or the like rise, the guide part is restrained from being hooked thereon and a protecting function of the end part of the engaging part can be prevented from being deteriorated.

According to a sixth aspect of the present invention, there is provided the clip, wherein the elastic engaging piece is formed so that an extension amount of an outer edge part thereof from the rib is reduced toward the guide part.

According to the above-described structure, even when the burs are inserted into the parts of the axial trimming grooves, since the outer edge parts of the end sides of the elastic engaging pieces are formed so that as the outer edge parts of the end sides of the elastic engaging pieces come nearer to the guide part, amounts of extension of the outer edge parts of the end sides of the elastic engaging pieces from the ribs are the shorter, that is, the outer edge parts of the end sides of the elastic engaging pieces are formed in oblique line shapes that come the nearer to the ribs as they come nearer to the guide part. Accordingly, the burs can be allowed to hardly come into contact with the elastic engaging pieces. If the burs come into contact with the elastic engaging pieces, the burs slide by the oblique lines so that the elastic engaging pieces can be hardly broken.

According to a seventh aspect of the present invention, there is provided the clip, wherein the outer edge part is formed to be continuous with a fattened out portion of the axial trimming groove at an axial position where the outer diameter of the reversely tapered part becomes minimum.

According to the above-described structure, since the end part of the elastic engaging piece is formed so that the end part of the elastic engaging piece in the direction of the guide part reaches the opening edge part of the axial trimming groove in the part of the reversely tapered part whose diameter is most reduced, even when the burs are inserted into the part of the axial trimming groove, the burs can be allowed to more hardly come into contact with the elastic engaging piece.

BRIEF DESCRIPTION OF THE DRAWINGS

FIG. 7A is a plan view showing a state that the elastic engaging pieces are allowed to pass through an attaching hole. FIG. 7B is a plan view showing a state that the elastic engaging pieces are fixed to the back side of the attaching hole.

FIG. 8A is an explanatory view showing a state that the clip is being inserted into the attaching hole. FIG. 8B is an explanatory view showing a state that a guide part passes through from the attaching hole to the back side of the attaching hole.

FIG. 10A shows a state that the clip is being inserted into an attaching hole. FIG. 10B is an explanatory view showing a state that the clip is inserted more deeply than that in FIG. 10A.

FIG. 11A is a perspective view thereof and FIG. 11B is a perspective view seen from a different direction from that of FIG. 11A.

FIG. 12A is a front view, FIG. 12B is a side view and FIG. 12C is a bottom view.

FIG. 14A is an explanatory view showing a state that the clip is being inserted into an attaching hole and FIG. 14B is a bottom vies of FIG. 14A.

DETAILED DESCRIPTION OF THE EMBODIMENTS

Figure 1:
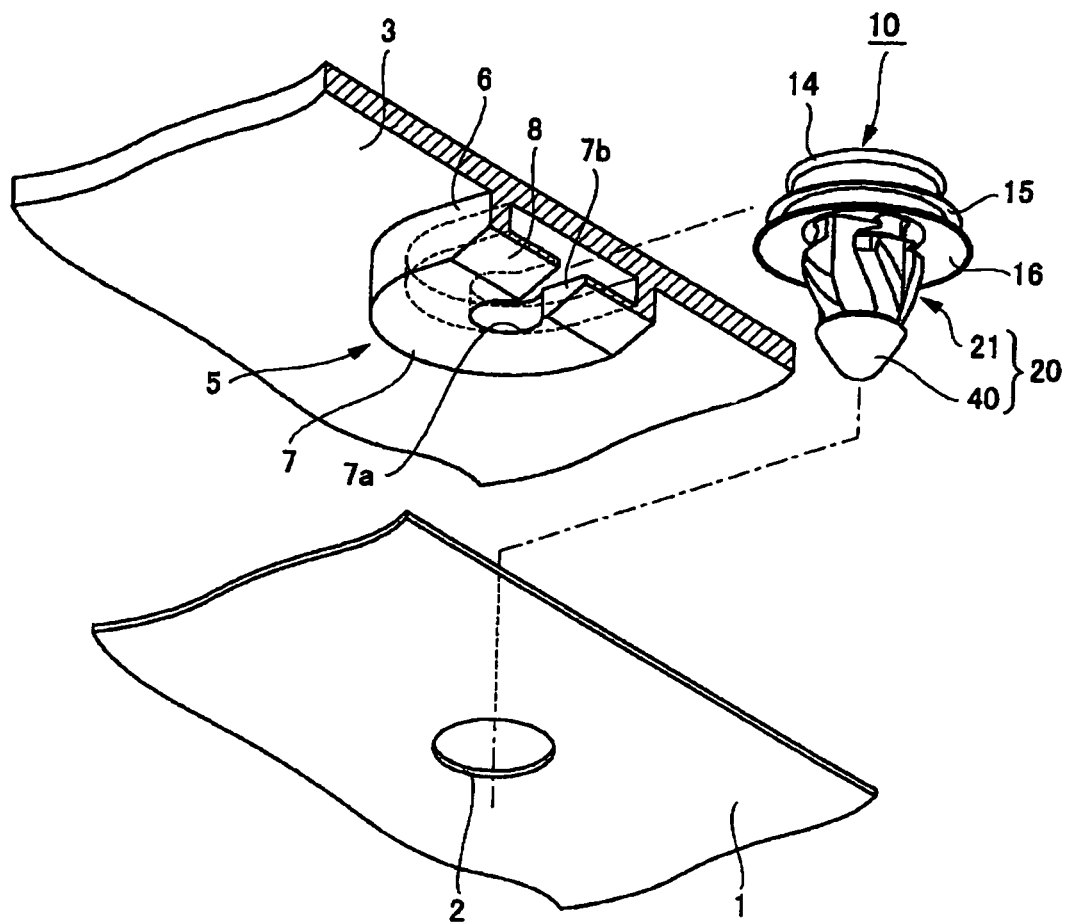
FIG. 1 is a perspective view showing one embodiment of a clip of the present invention.

One embodiment of a clip of the present invention will be described below by referring to the drawings. As shown in FIGS. 1, 9A and 9B, a clip 10 is used so as to be inserted into and fixed to an attaching hole 2 formed on an attached-side member such as a vehicle body panel 1 to attach an attaching member such as a trim board 3 thereto through the clip 10.

As shown in FIG. 1, on a back surface side of the trim board 3, a frame shaped attaching seat 5 is provided that includes a substantially U shaped side wall 6 having a front surface side and a bottom surface side opened and a bottom wall 7 connected to the bottom surface of the side wall 6. On a center of the bottom wall 7, a diameter enlarged hole 7a is formed to have an inside diameter larger than the outside diameter of a below-described neck portion 13 (see FIGS. 9A and 9B) of the clip 10. This diameter enlarged hole 7a communicates with an inserting groove 7b cut out with a given width from a front opening side of the bottom wall 7. In a lower surface of the front opening side of the attaching seat 5, a tapered surface 8 whose height is gradually lowered toward the end of the opening.

Figure 2:
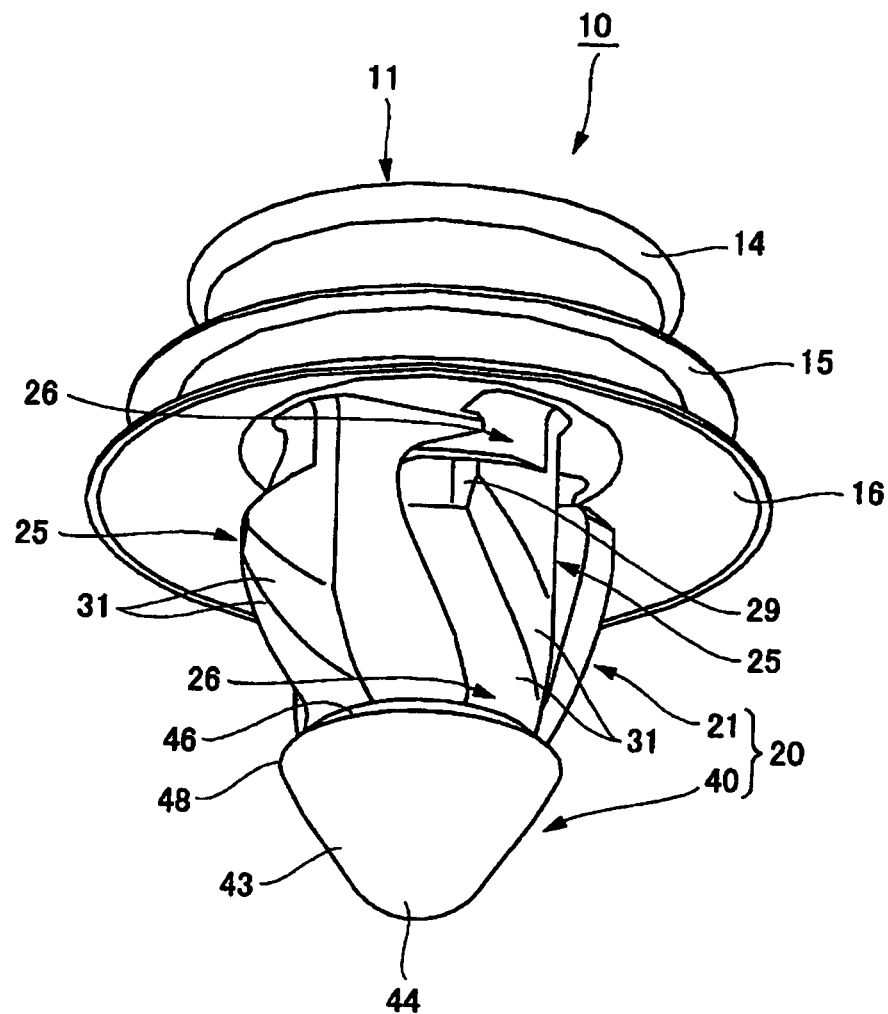
FIG. 2 is an enlarged perspective view of the clip.
Figure 3:
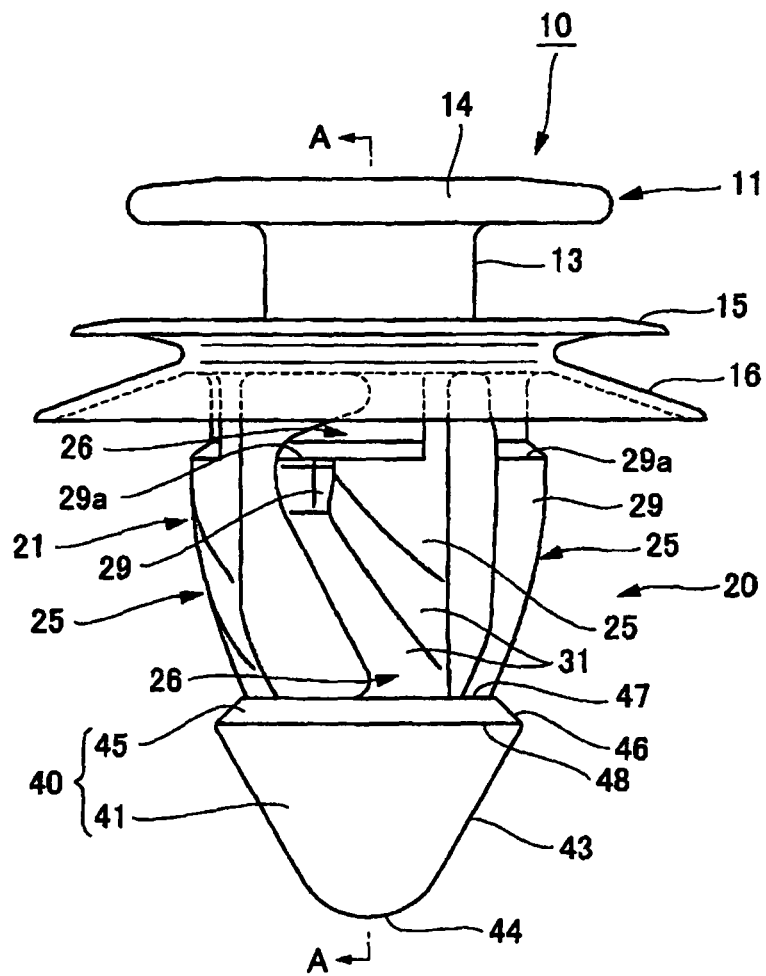
FIG. 3 is a front view of the clip.
Figure 4:
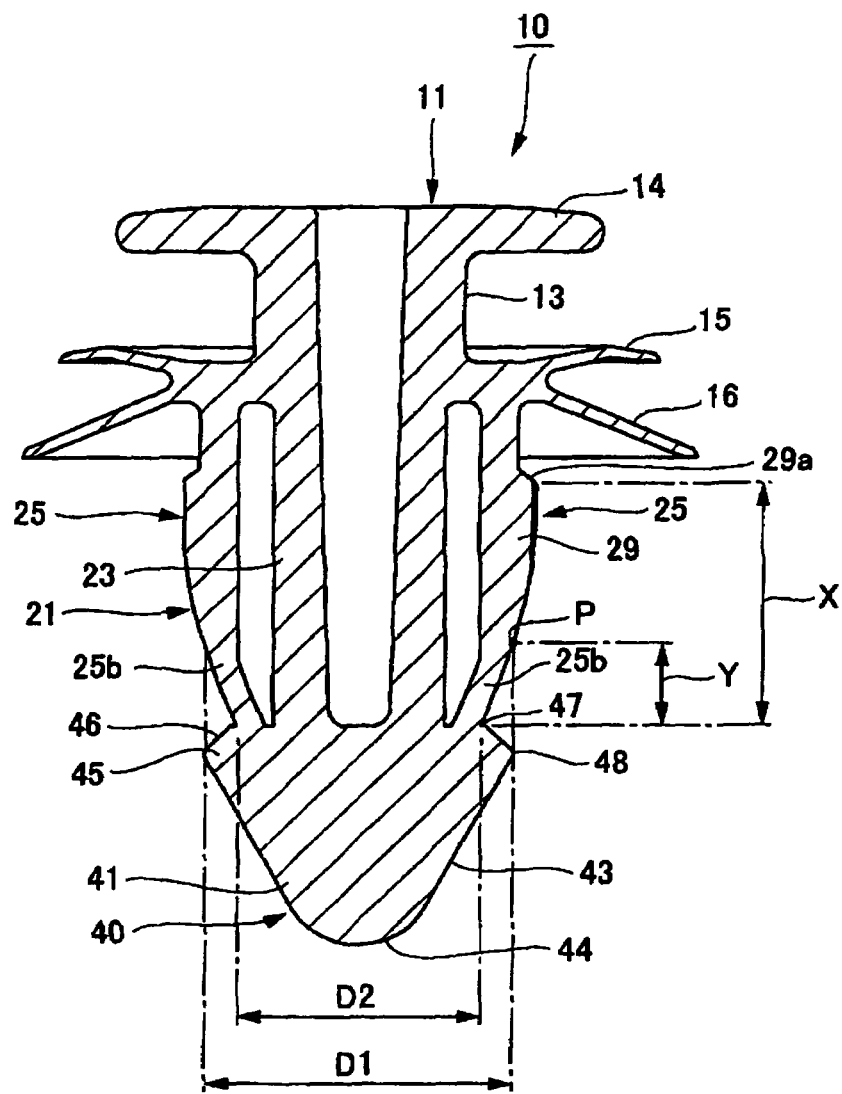
FIG. 4 is a sectional view taken along a line of A-A in FIG. 3.
Figure 5:
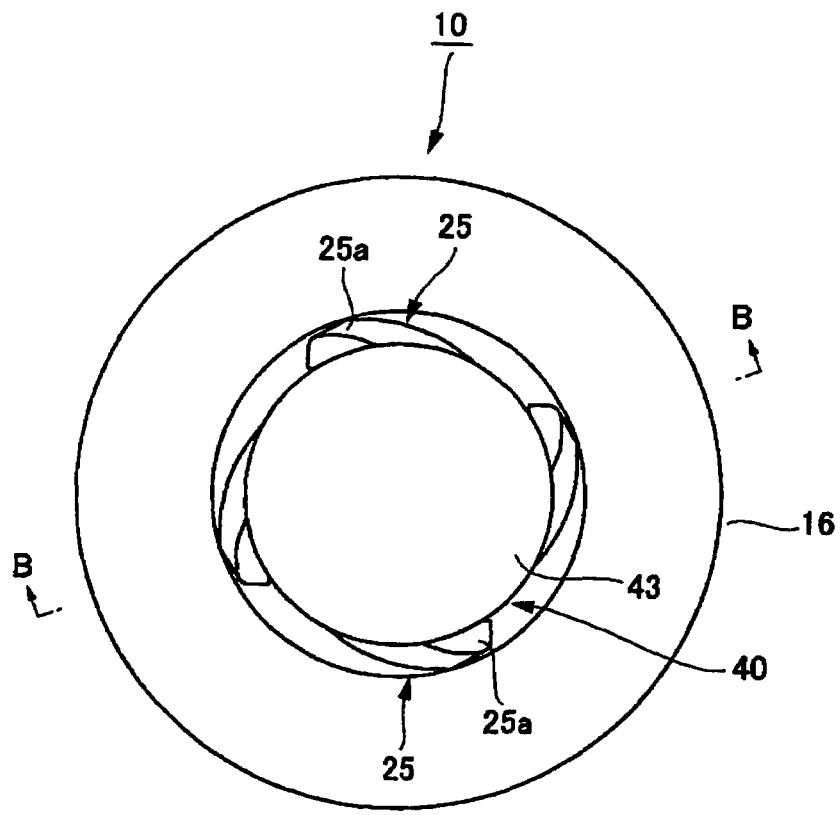
FIG. 5 is a bottom view of the clip.

As shown in FIGS. 2 to 4, the clip 10 has a head portion 11 composed of the neck portion 13, a first flange 14, a second flange 15 and a third flange 16 respectively formed in the upper end part, the intermediate part and the lower end part of the neck portion 13. The peripheral edge of the third flange 16 is widened obliquely downward in the shape of an umbrella. The third flange 16 is functioning as a flange to abut on the front side of the attaching hole 2 when the clip 10 is fixed to the attaching hole 2 (see FIGS. 9A and 9B).

As shown in FIG. 1, the head portion 11 of the clip 10 is aligned with and pushed into the opening of the attaching seat 5, so that the neck portion 13 of the clip 10 passes through the inserting groove 7b and is inserted into the diameter enlarged hole 7a and the bottom wall 7 of the attaching seat 5 is sandwiched between the first flange 14 and the second flange 15 to attach the clip 10 to the trim board 3. Since the neck portion 13 of the clip 10 has the diameter smaller than that of the diameter enlarged part 7a of the attaching seat 5, the neck portion 13 can be displaced in the diameter enlarged part 7a.

On one surface of the third flange 16 of the head portion 11, a leg portion 20 inserted into and fixed to the attaching hole 2 is provided. The leg portion 20 includes an engaging part 21 engaged with the back side of the attaching hole 2 and a guide part 40 connected to the end part of the engaging part 21.

Referring to FIGS. 2 to 7B, the structure of the engaging part 21 will be described below. The engaging part 21 includes a pillar portion 23 of a square form extended vertically from the center of the one surface of the third flange 16 and having a central part lightened, a plurality of ribs 24 (see FIGS. 7A and 7B) extending in the shifted-radial direction from the outer periphery of the pillar portion 23 and a plurality of elastic engaging pieces 25 extending along the circumferential direction from the ends of the plurality of the ribs 24 and engaged with the back side of the attaching hole 2.

Figure 7A:
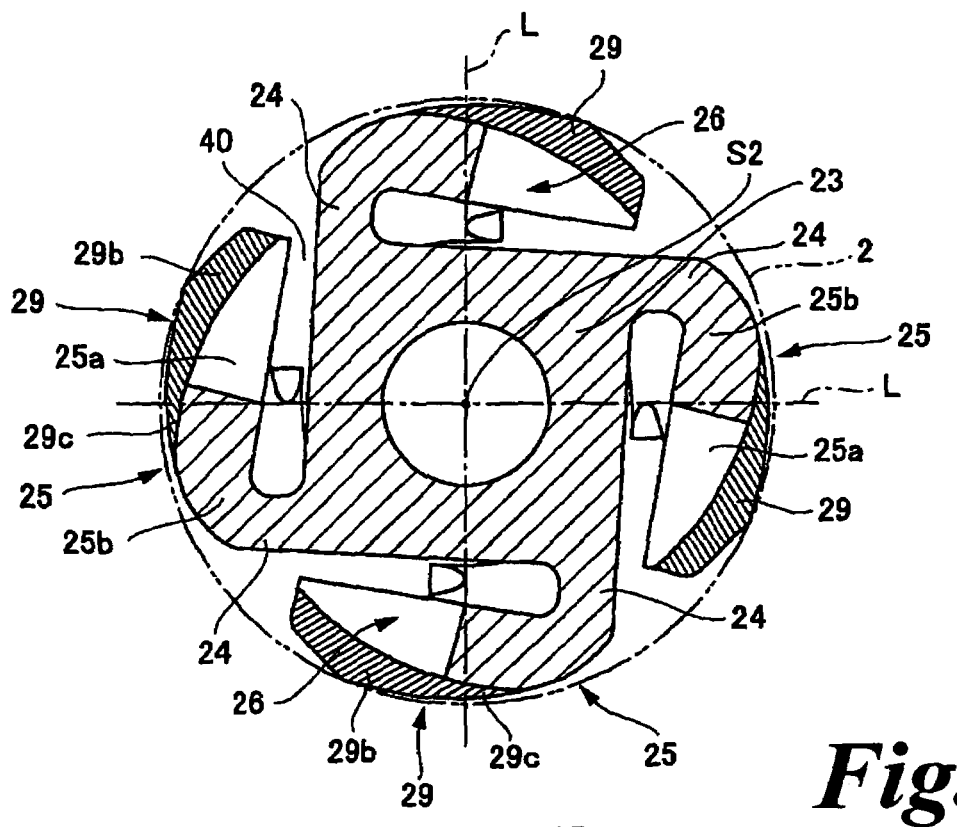
FIGS. 7A and 7B show a state of elastic engaging pieces of the clip.
Figure 7B:
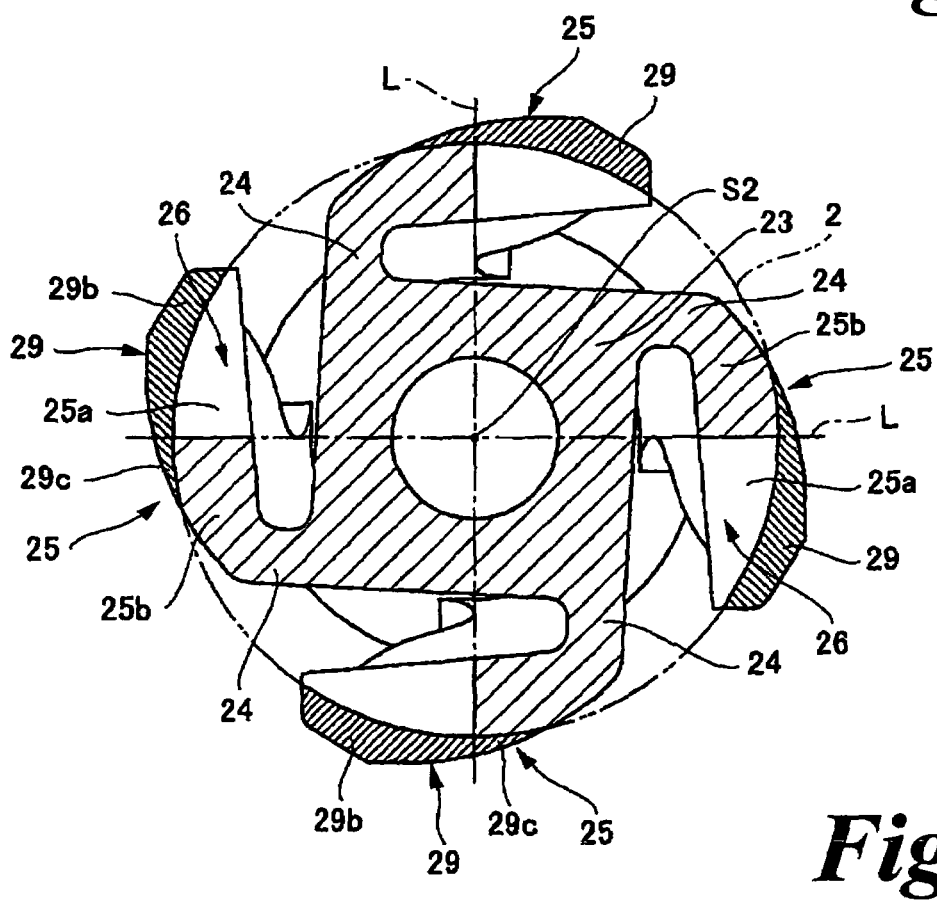

The parts will be respectively described in detail. In this embodiment, as shown in FIGS. 7A and 7B, the ribs 24 are shifted from an axis S2 of the pillar portion 23 and are respectively extended from one ends of side surfaces of the square-shaped pillar portion 23. The four ribs 24 are arranged at equal intervals in the circumferential direction of the pillar portion 23. Upper ends of the ribs 24 in the axial direction are respectively connects to the third flange 16 and lower ends of the ribs 24 in the axial direction are respectively connected to the base end part 47 of the guide part 40.

From the ends of the ribs 24 respectively, the plurality of the elastic engaging pieces 25 to be engaged with the back side of the attaching hole 2 are extended along the circumferential direction. In this embodiment, from the four ribs 24 respectively extended from the side surfaces of the square-shaped pillar portion 23, the four elastic engaging pieces 25 are respectively extended.

As shown in FIGS. 2 and 3, in both upper and lower ends in the axial directions of the elastic engaging pieces 25 respectively, notches 26 and 26 with a given length are provided along the circumferential direction from ends in their extending directions. Referring to FIGS. 7A and 7B together therewith, in this embodiment, the notches 26 are formed with a length extending from the ends in the extending directions of the elastic engaging pieces 25 to a line L passing the axis S2 of the pillar portion 23.

By the notches 26 and 26, in the elastic engaging pieces 25, flexible deforming parts 25a in the end sides in the extending directions (see FIG. 6), and rigid parts 25b in the base sides of the extending directions (see FIG. 4) are formed.

The flexible deforming parts 25a are not connected to the third flange 16 and the base end part 47. The rigid parts 25b are connected to the third flange 16 and the base end part 47 and shorter than the flexible deforming parts 25a. In the elastic engaging pieces 25, as shown in FIG. 7A, the distal-side flexible deforming parts 25a are flexibly bent and deformed from the base-side rigid parts 25b in as starting points.

At least in the flexible deforming parts 25a of the elastic engaging pieces 25, swelling parts 29 are provided that swell with a given height in the shifted-radial direction from the inside diameter of the attaching hole 2. As shown in FIGS. 7A and 7B. In this embodiment, the swelling parts 29 include first swelling parts 29b swelling from outer peripheral surfaces along the circumferential direction of the flexible deforming parts 25a and second swelling parts 29c swelling from the outer peripheral surfaces of the rigid parts 25b continuously to the first swelling parts 29b. The swelling parts 29 are provided substantially at intermediate positions of the elastic engaging pieces 25 in the axial directions.

As shown in FIGS. 7A and 7B, in the swelling parts 29, the height of the second swelling parts 29c is lowest at the base sides in the circumferential direction and gradually increases toward ends along the circumferential direction therefrom. The height of the first swelling parts 29b becomes highest at intermediate parts along the circumferential direction, and is the same toward the ends in the circumferential direction therefrom. As shown in FIG. 3, upper end parts 29a of the swelling parts 29 are formed to have stepped parts gradually inclined obliquely downward toward the shifted-radial direction. The stepped upper end parts 29a of the swelling parts 29 are engaged with the peripheral edge of the back side of the attaching hole 2 (see FIGS. 9A and 9B) to fix the clip 10 to the attaching hole 2.

In the embodiment, the diameters of the upper end parts 29a are most enlarged in the elastic engaging pieces 25, and the upper end parts 29a are functioning as a "maximum diameter part of the engaging part".

In the outer peripheral surfaces of the elastic engaging pieces 25 in the sides of the notches 26 respectively located in the lower ends of the axial directions of the elastic engaging pieces 25, a plurality of tapered surfaces 31 are formed whose diameters are reduced gradually toward the guide part 40 (see FIGS. 2 and 3). Thus, the elastic engaging pieces 25 are formed so that the outer peripheries of the elastic engaging pieces are gradually thinned and narrowed toward the guide part 40.

The guide part 40 connected to the end part of the engaging part 21 will be described below. The guide part 40 includes a tapered part 43 formed in the outer periphery of an end side and having the diameter reduced gradually toward the inserting direction of the leg portion 20 (refer it to as an "inserting direction", hereinafter) to the attaching hole 2, a reversely tapered part 46 having the diameter reduced gradually in an opposite direction to the inserting direction and a diameter enlarged part 48 formed between the reversely tapered part 46 and the tapered part 43 and having the diameter most enlarged in the guide part 40.

The guide part 40 in this embodiment includes a substantially conical guide head part 41 having the rounded end and a base pedestal part 45 connected to an opposite side to the protruding direction of the guide head part 41 and formed in a substantially truncated conical shape having the diameter reduced in the outer periphery. In the outer periphery of the guide head part 41, there are formed the tapered part 43 having the diameter reduced gradually from the peripheral edge of the end side of a circular bottom part toward the inserting direction and a ceiling part 44 having a curved surface. The circular bottom part forms the diameter enlarged part 48 having the diameter most enlarged in this embodiment. On the other hand, in the outer periphery of the base pedestal part 45, there are formed the reversely tapered part 46 having the diameter reduced gradually from the peripheral edge of the base side of the diameter enlarged part 48 toward the opposite direction to the inserting direction and the base end part 47 having a flat surface.

Figure 6:
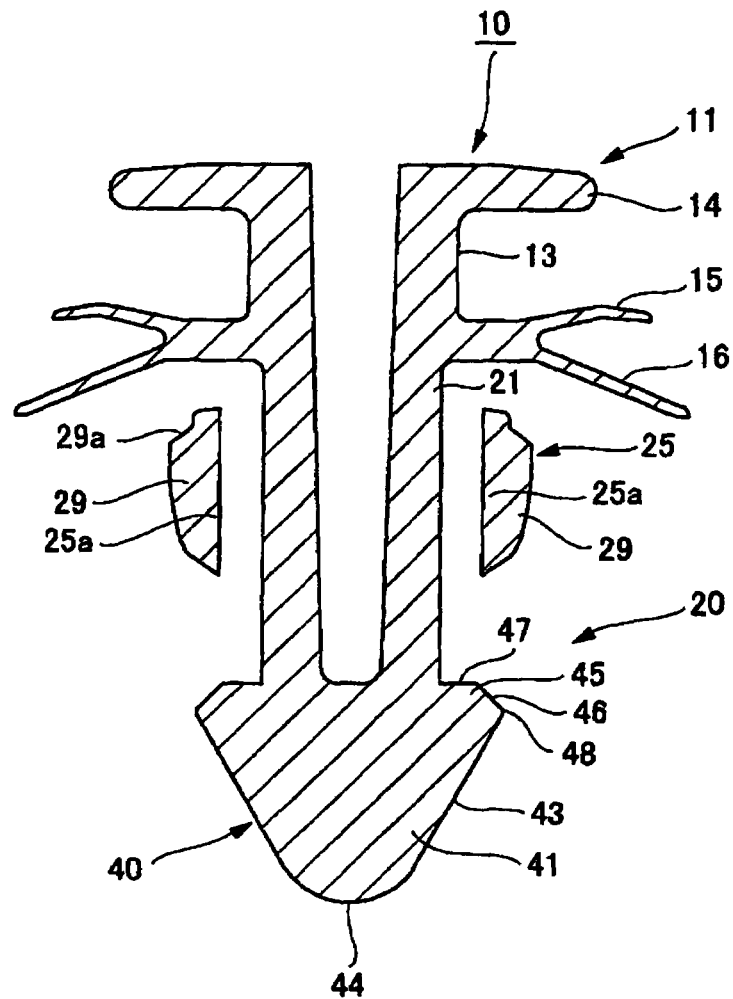
FIG. 6 is a sectional view taken along a line of B-B in FIG. 5.

As shown in FIGS. 4 and 6, the guide part 40 is formed to be solid without a lightening hole, and the outer peripheral surface of the tapered part 43 has a continuous surface having no stepped part. As shown in FIGS. 4 and 6, to the flat base end part 47 of the base pedestal part 45, the end of the pillar portion 23 is connected and the rigid parts 25b (see FIGS. 7A and 7B) of the elastic engaging pieces 25 are connected.

As shown in FIG. 4, the maximum outside diameter D1 of the diameter enlarged part 48 of the guide part 40 is formed to be larger than the outside diameter of the end part of the engaging part 21. In this embodiment, the outside diameter D2 of the lower end parts of the plurality of the elastic engaging pieces 25 in the axial direction, as parts whose diameters are the narrowest and most reduced, forms the outside diameter of the end part of the engaging part 21 in this embodiment.

As described above, since the maximum outside diameter D1 of the diameter enlarged part 48 is formed to be larger than the outside diameter D2, when the leg portion 20 is inserted into the attaching hole 2 and the diameter enlarged part 48 passes through the attaching hole 2, the outer peripheral surfaces of the elastic engaging pieces 25 in the upper end sides from the lower end sides butt against the peripheral edge of the attaching hole 2 via the lower end parts of the elastic engaging pieces 25. Thus, the maximum outside diameter D1 of the diameter enlarged part 48 serves to protect the outer peripheries of the lower end parts of the elastic engaging pieces 25. In this embodiment, to sufficiently satisfy this function, the maximum outside diameter D1 of the diameter enlarged part 48 is set as described below.

Now, this will be described below by referring to FIG. 4. When it is assumed that an axial distance from the base end part 47 of the guide part 40 to the upper end parts 29a of the swelling parts 29 as the largest diameter part of the engaging part 21 is X and an axial distance from the base end part 47 of the guide part 40 to a position P where the outside diameter of the engaging part 21 has the same size as that of the diameter enlarged part 48 of the guide part 40 is Y, the maximum outside diameter D1 of the diameter enlarged part 48 of the guide part 40 is set so as to satisfy a relation of $Y > \frac{1}{3}X$.

As a result of forming the diameter enlarged part 48 having the above-described maximum outside diameter D1, when the clip 10 is viewed from the end side in the axial direction, the rigid parts 25b (see FIG. 4) in the base side of the extending directions of the elastic engaging pieces 25 are covered not so as to protrude from the outer periphery of the guide part 40 and the flexible deforming parts 25a in the end sides of the extending directions of the elastic engaging pieces 25 protrude with a given length from the outer periphery of the guide part 40.

Consequently, even when the leg portion 20 is misaligned with and inserted into the attaching hole 2, and the tapered part 43 is inserted and rubbed by the inner periphery of the attaching hole 2, after the diameter enlarged part 48 passes through the attaching hole 2, a position where the outer periphery of the engaging part 21 firstly abuts on the inner periphery of the attaching hole 2 is at least higher than the position P. Therefore, at least the area of Y is not rubbed by the inner periphery of the attaching hole 2 and passes through the attaching hole 2. Thus, the rigid parts 25b of the elastic engaging pieces 25 can be prevented from being rubbed and broken by the inner periphery of the attaching hole 2.

Although the guide part 40 has the substantially conical guide head part 41 and the substantially truncated conical base pedestal part 45 connected thereto in this embodiment, the form of the guide part 40 is not limited thereto. Any form in which at least the tapered part 43, the reversely tapered part 46 and the diameter enlarged part 48 provided between both the tapered parts may be employed. Various kinds of forms may be used, for instance, may be employed a form obtained by connecting conical bodies together or pyramid bodies together, an elliptic form or an oval form whose major axis side is directed toward an inserting direction, or a form in which the diameter enlarged part 48 is extended long in a cylindrical shape and a tapered part and a reversely tapered part are provided at both ends thereof.

In the embodiment, the plurality of the elastic engaging pieces 25 that are extended in the blade form along the circumferential direction are provided in the engaging part 21 and the guide part 40 is connected to the end of the engaging part 21. However, the form of the engaging part 21 is not limited thereto. For instance, a plate shaped stem part may be extended from the center of the back surface of the flange, a pair of engaging pieces may be provided that extend obliquely upward to the flange in the forms of legs of an anchor from both side surfaces of the end of the stem part and the guide part may be connected to the end thereof as the engaging part.

Now, a using method of the clip 10 having the above-described structure will be described below by referring to FIGS. 7A to 10B.

Figure 8A:
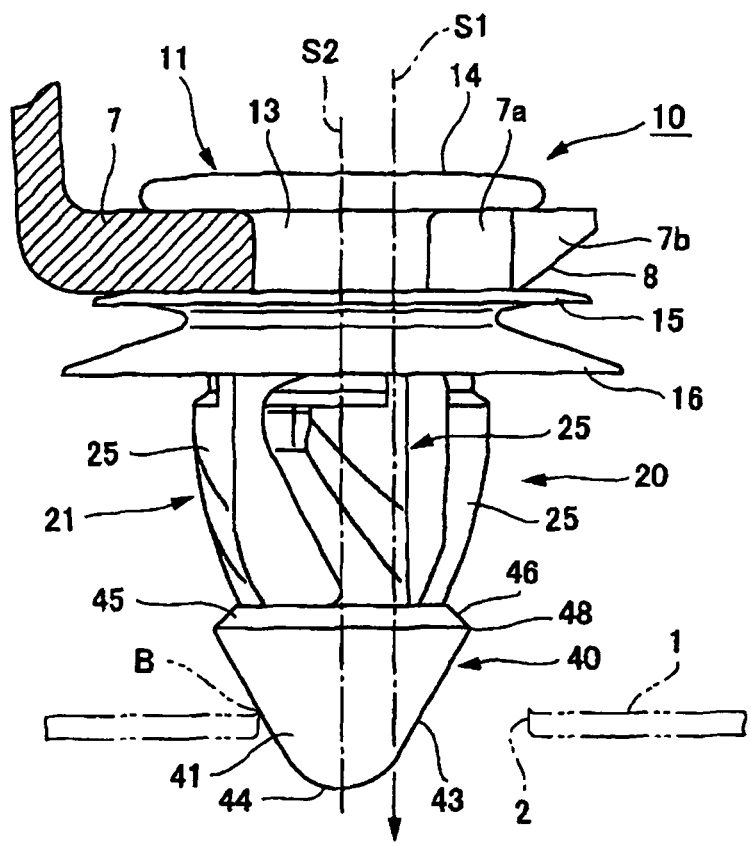
FIGS. 8A and 8B show a using state of the clip.

Initially, as described above, the head portion 11 of the clip 10 is aligned with and pushed into the opening of the attaching seat 5 (see FIG. 1), the neck portion 13 is inserted into the diameter enlarged hole 7a through the inserting groove 7b and the bottom wall 7 of the attaching seat 5 is sandwiched between the first flange 14 and the second flange 15 to attach the clip 10 to the trim board 3 (see FIG. 8A).

Under this state, as shown in FIG. 8A, the leg portion 20 of the clip 10 is inserted from the front side of the attaching hole 2 of the vehicle body panel 1. At this time, even when there are burs B rising from the peripheral edge of the front side of the attaching hole 2 during a punching molding process, since the tapered part 43 whose diameter is reduced gradually toward the inserting direction is provided in the guide part 40 in the clip 10, the burs B are prevented from biting into or being hooked on the tapered part 43 during the insertion of the leg portion 20, so that the leg portion 20 can be smoothly inserted into the attaching hole.

In the embodiment, since the outer peripheral surface of the tapered part 43 of the guide part 40 is formed to have a continuous surface without stepped part, the burs B can be more assuredly prevented from biting into or being hooked on the tapered surface 43.

The leg portion 20 of the clip 10 is not necessarily pushed into the attaching hole 2 under a state that the leg portion 20 is aligned with the axis of the attaching hole 2. The leg portion 20 is frequently pushed into the attaching hole 2 under a state that the leg portion 20 is misaligned with the attaching hole 2. As shown in FIG. 8A, even when the leg portion 20 is pushed into the attaching hole 2 under a state the axis S2 of the leg portion 20 deviates from the center S1 of the attaching hole 2, since the tapered part 43 abuts on the inner periphery of the attaching hole 2 and can be guided thereby when being pushed, the leg portion 20 can be aligned with and centered on the attaching hole 2 so that the axis S2 of the leg portion 20 corresponds to the center S1 of the attaching hole 2. As a result, even when the leg portion 20 is not exactly positioned to the attaching hole 2, the clip 10 can be inserted into the attaching hole 2 by a simple operation for roughly aligning the leg portion with the attaching hole and pushing the leg portion into the attaching hole. Accordingly, an inserting workability of the clip 10 can be improved.

Figure 8B:
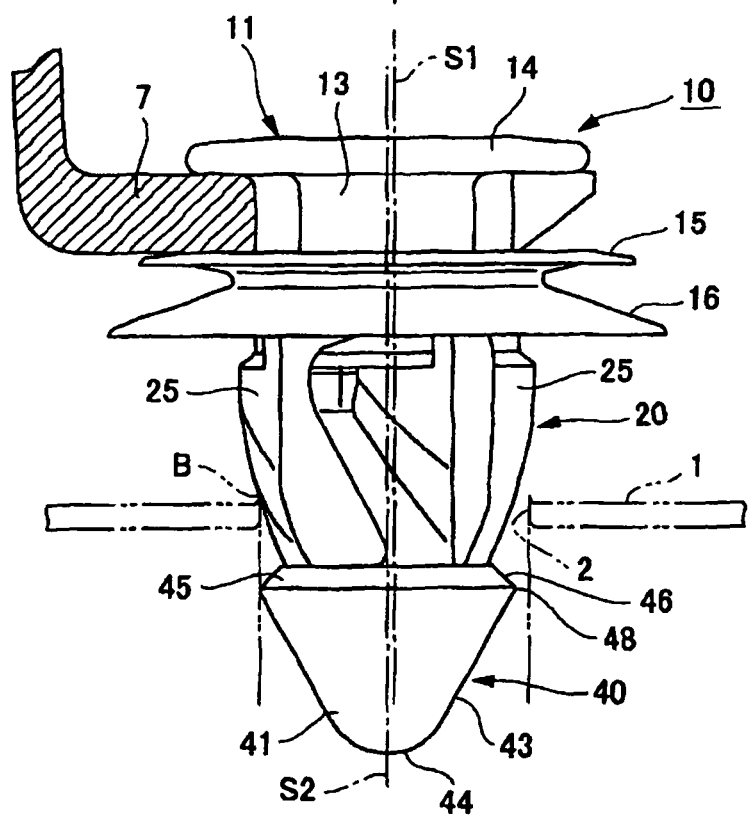

When the leg portion 20 is pushed into the attaching hole 2 as described above, the tapered part 43 abuts on the inner peripheral edge of the attaching hole 2 and is guided thereby and pushed into the attaching hole. In this clip 10, when the diameter enlarged part 48 of the guide part 40 passes through the attaching hole 2, as shown in FIG. 8B, the outer peripheral surfaces of the elastic engaging pieces 25 in the upper end parts above the lower end parts butt against the peripheral edge of the attaching hole 2 over the lower end parts of the elastic engaging pieces.

Figure 9:
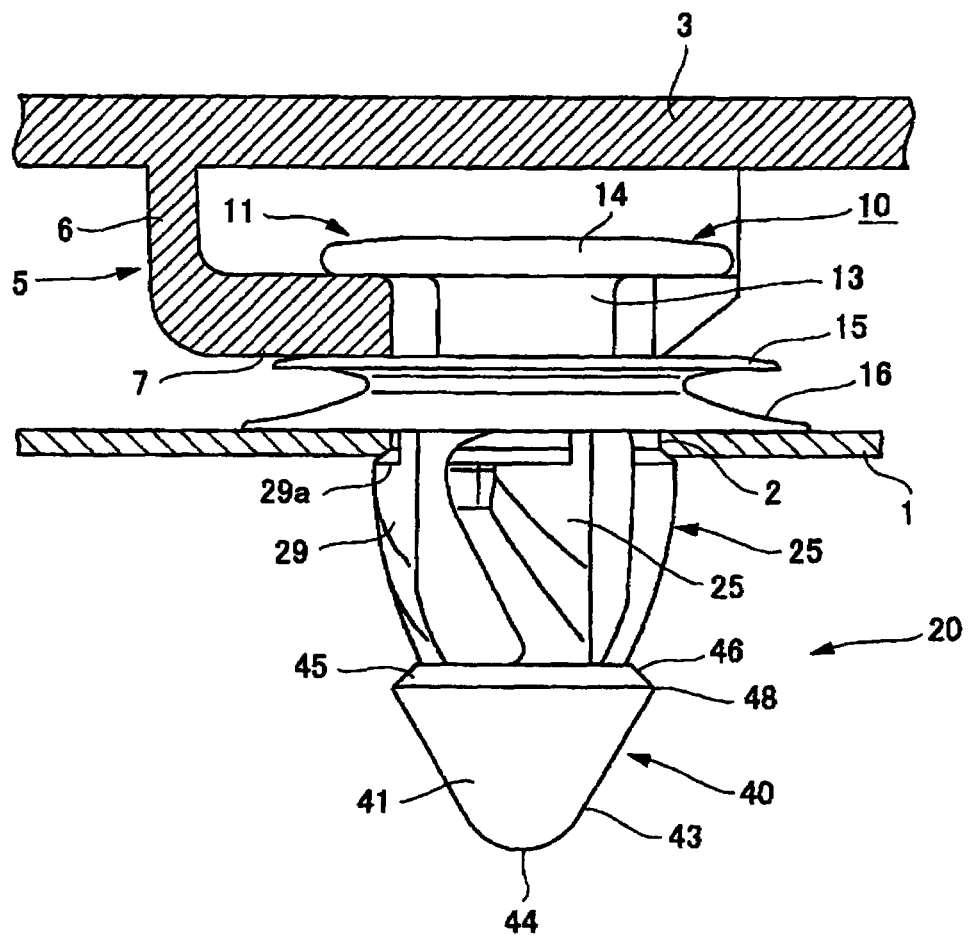
FIG. 9 is an explanatory view showing a state that an attaching member is attached to an attached-side member by using the clip.

Under this state, when the clip 10 is further pushed into the attaching hole 2, as shown in FIG. 7A, if the swelling parts 29 abut on the inner periphery of the attaching hole 2, the elastic engaging pieces 25 are pressed and bent inward and the upper end parts 29a of the swelling parts 29 protrude on the back side of the attaching hole 2, the elastic engaging pieces 25 are elastically restored and the upper end parts 29a of the swelling parts 29 are engaged with the peripheral edge of the attaching hole 2 (see FIG. 7B) from the back side. Along therewith, the third flange 16 elastically abuts on the peripheral edge of the attaching hole 2 from the front side to sandwich the vehicle body panel 1 between both the upper end parts 29a and the third flange 16. Thus, as shown in FIG. 9, the clip 10 is fixed to the attaching hole 2 and the trim board 3 can be attached to the vehicle body panel 1 through the clip 10.

Now, effects of the clip 10 of the embodiment will be described below by comparing with a clip 100 of a comparative example shown in FIGS. 10A and 10B. The clip 100 of the comparative example basically has the same structure as that of the clip 10 of the embodiment (the same parts are designated by the same reference numerals). However, an end part 101 of a leg portion 20 is formed in a substantially conical shape and a plurality of elastic engaging pieces 25 are continuously extended from an outer peripheral edge of its base end surface.

Figure 10A:
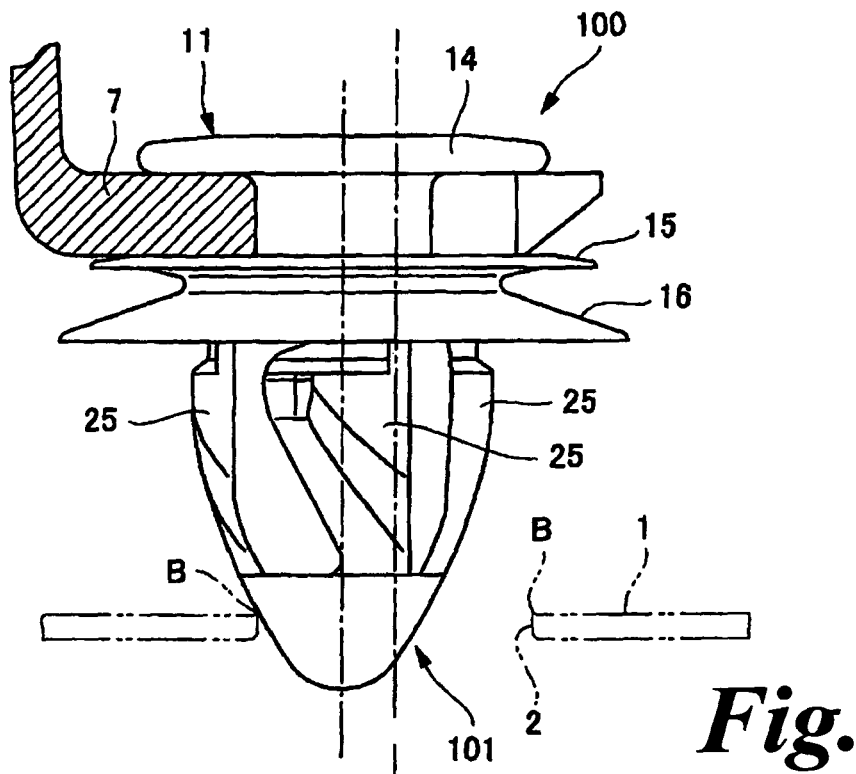
FIGS. 10A and 10B show a clip of a comparative example.
Figure 10B:
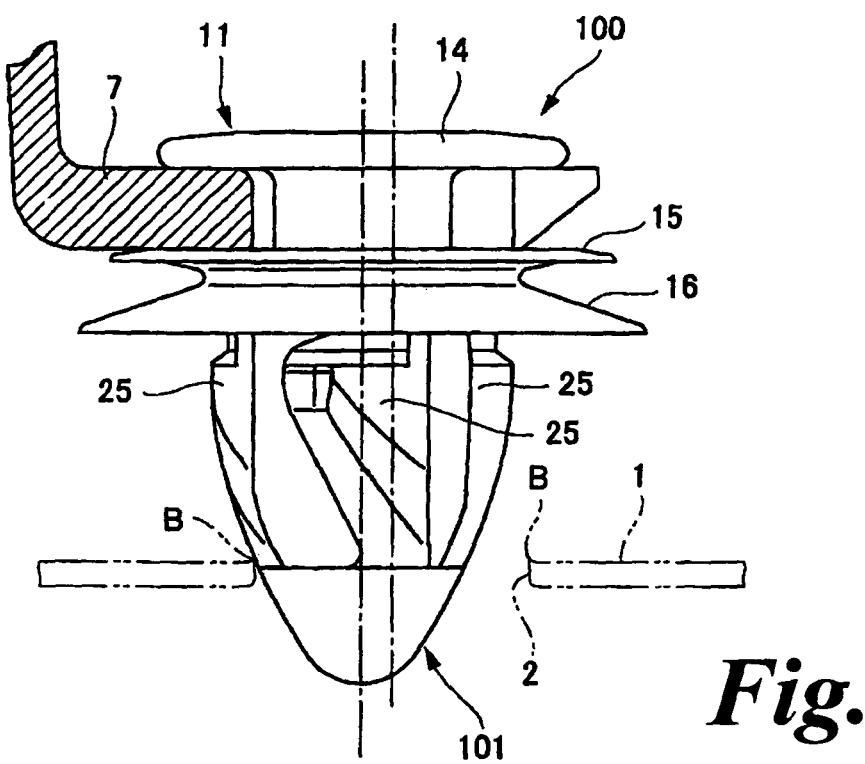

Then, when the clip 100 of the comparative example is pushed into an attaching hole 2, burs B on the peripheral edge of the attaching hole 2 butt against the outer periphery of the end part 101 (see FIG. 10A). As shown in FIG. 10B, the burs B butt against the outer peripheral surfaces of the lower end parts of the elastic engaging pieces 25 and the clip 100 scrapes off the outer peripherals surfaces of the lower ends and is pushed into the attaching hole. Therefore, the outer peripheries of the lower end parts of the elastic engaging pieces 25 are damaged so that the bending force or the elastically restoring force of the elastic engaging pieces 25 may be occasionally deteriorated.

On the other hand, in the clip 10 of the embodiment, when the leg portion 20 is inserted into the attaching hole 2, after the diameter enlarged part 48 passes through the attaching hole 2, the attaching hole does not abut on the lower end parts of the elastic engaging pieces 25 and the outer peripheral surfaces of the upper end parts above the lower end parts of the elastic engaging pieces 25 butt against the peripheral edge of the attaching hole 2. Accordingly, the lower end arts and the parts therearound of the elastic engaging pieces 25 can be protected from being damaged and lost.

In this embodiment, since the outer peripheries of the lower end parts of the rigid parts 25b in the base side of the extending direction of the elastic engaging pieces 25 that serve as the starting points of the bending deformation of the elastic engaging pieces 25 can be properly protected, the bending force or the elastically restoring force of the elastic engaging pieces 25 can be maintained and the securing force to the attaching hole 2 can be held. Further, when the leg portion 20 is inserted into the attaching hole 2, since the peripheral edge of the attaching hole 2 is designed to avoid and not to butt against the rigid parts 25b high in rigidity and hardly flexibly bent, the leg portion 20 can be smoothly inserted into the attaching hole 2 with a relatively low insertion resistance and, accordingly, an attaching workability can be improved.

Further, in this embodiment, as shown in FIG. 4, when it is assumed that an axial distance from the base end part 47 of the guide part 40 to the upper end parts 29a of the swelling parts 29 is X and an axial distance from the base end part 47 of the guide part 40 to a position P where the outside diameter of the engaging part 21 has the same size as that of the diameter enlarged part 48 of the guide part 40 is Y, the maximum outside diameter D1 of the diameter enlarged part 48 is set so as to satisfy a relation of $Y > \frac{1}{3}X$. Accordingly, the axial distance Y can be sufficiently ensured. Therefore, even when the leg portion 20 is inserted obliquely into the attaching hole 2, a wide range including the lower end parts of the elastic engaging pieces 25 and the parts near the lower end parts can be protected not so as to butt against the peripheral edge of the attaching hole 2.

Further, in this embodiment, since the elastic engaging pieces are employed that are connected to the ribs 24 extending from the outer periphery of the pillar portion 23, extended in the circumferential direction and relatively easily bent, even when the entire axial length of the engaging part 21 is reduced, the elastic engaging pieces 25 can be sufficiently bent. That is, since the entire length of the engaging part can be reduced, even when the guide part 40 is connected to the end part of the engaging part 21, the entire length of the clip 10 can be formed to be relatively short to realize compactness.

When the trim board 3 is desired to be detached from the vehicle body panel 1 because of some reason such as a maintenance, the trim board 3 is raised to be separated from the vehicle body panel 1 and the clip 10 is pulled so that the diameters of the elastic engaging pieces 25 are reduced to pull out the leg portion 20 from the attaching hole 2. At this time, the engaging part 21 and the guide part 40 are sequentially pulled out from the attaching hole 2. Since the e reversely tapered part 46 is provided in the outer periphery of the guide part 40 opposite to the tapered part 43, even when the reversely tapered part 46 abuts on the peripheral edge of the back side of the attaching hole 2, the reversely tapered part 46 is not caught thereby and the guide part 40 can be smoothly pulled out from the attaching hole 2. Thus, the clip 10 can be easily pulled out from the attaching hole 2 and the vehicle body panel 1 can be detached from the trim board 3.

Since the notches 26 with a given length are provided from the ends of the extending directions of the elastic engaging pieces 25 along the circumferential direction in both end parts in the axial directions of the elastic engaging pieces 25, the flexible deforming parts 25a that are not connected to the third flange 16 and the base end part 47 of the guide part 40 and the rigid parts 25b that are connected to the third flange 16 and the base end part 47 of the guide part 40 are provided in the elastic engaging pieces 25.

As described above, since the flexible deforming parts 25a that are not connected to the third flange 16 and the base end part 47 of the guide part 40 are provided, when the leg portion 20 is inserted into the attaching hole 2, the flexible deforming parts 25a are pressed by the inner periphery of the attaching hole 2 and easily flexibly bent and deformed, so that the clip 10 can be inserted into and fixed to the attaching hole 2 with a relatively small inserting force. In addition thereto, since the elastic engaging pieces 25 are provided along the circumferential direction from the ribs 24, the elastic engaging pieces 25 extended in the circumferential direction can be engaged with the peripheral edge of the back side of the attaching hole 2 with a wide contact area without increasing the inserting force of the clip 10 to strongly fix the clip 10 to the attaching hole 2.

Further, even when an external force acts on the clip 10 in diametrical direction or a pulling direction under a state that the clip 10 is fixed to the attaching hole 2, since the ribs 24 and the rigid parts 25b connected to the third flange 16 and the base end part 47 of the guide part 40 are provided, a deformation is suppressed by these parts. Thus, the entire part of the elastic engaging pieces 25 is not flexibly bent so that the clip 10 can be firmly held at a given position.

Further, in the clip 10 of this embodiment, in at least the flexible deforming parts 25a of the elastic engaging pieces 25, the swelling parts 29 are provided that swell with a given height in the shifted-radial direction from the inside diameter of the attaching hole 2.

Thus, since the first swelling parts 29b forming the swelling parts 29 are provided in the outer peripheral surfaces of the flexible deforming parts 25a that are liable to be flexibly bent and engaged with the peripheral edge of the back side of the attaching hole 2, an engagement margin to the attaching hole 2 can be sufficiently ensured under a state that the inserting force of the clip 10 is held to be low and the clip 10 can be firmly fixed to the attaching hole 2.

Further, in the clip 10 of this embodiment, in the rigid parts 25b, the second swelling parts 29c that are larger than the inside diameter of the attaching hole 2, however, have amounts of protrusion smaller than those of the first swelling parts 29a provided in the flexible deforming parts 25a are formed continuously to the first swelling parts 29b provided in the flexible deforming parts 25a.

Thus, when the clip 10 is attached to attaching hole 2, the second swelling parts 29c formed in the outer peripheral surfaces of the rigid parts 25b are strongly pressed by the edge of the panel. Thus, the ribs 24 are respectively pressed in the circumferential direction to urge the clip 10 in a rotating direction. Accordingly, even when the burs remain in the inner periphery of the attaching hole 2, the clip 10 is hardly caught by the burs. Further, since the maximum swelling parts are provided in the flexible deforming parts 25a, a low inserting force can be maintained.

Further, in the clip 10 of this embodiment, the extending directions of the ribs 24 extended in the shifted-radial direction from the outer periphery of the pillar portion 23 are set to directions that do not pass the axis S2 of the pillar portion 23. Thus, since the extending directions of the ribs 24 are set to the directions that do not pass the axis S2 of the pillar portion 23, extending angles of the elastic engaging pieces 25 extended from the ends of the ribs 24 can be assured relative to the ribs 24 as much as possible within a range in which inserting characteristics to the attaching hole 2 are not deteriorated. As a result, large spaces can be secured between the pillar portion 23 and the elastic engaging pieces 25. Especially, since the bending spaces of the rigid parts 25b can be sufficiently secured, when the leg portion 20 is inserted into the attaching hole 2, the elastic engaging pieces 25 can be more easily bent.

FIGS. 11A to 14B show another embodiment of a clip according to the present invention. Parts substantially the same as those of the above-described embodiment will be designated by the same reference numerals and an explanation thereof will be omitted.

Figure 13:
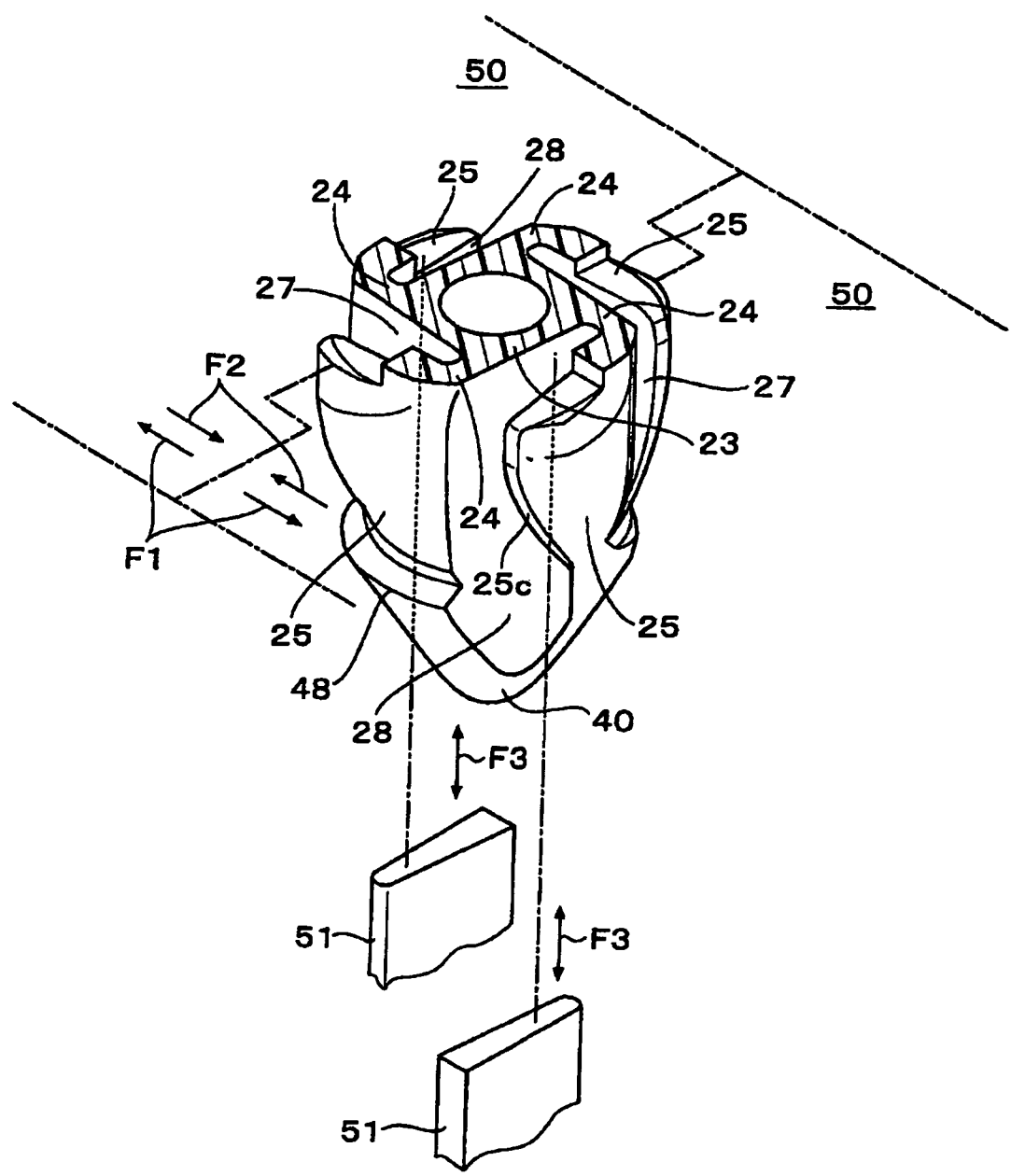
FIG. 13 is a schematic perspective view showing a molding die for forming the clip.

A clip 10a of this embodiment has a basic structure the same as that of the clip 10 of the above-described embodiment and four ribs 24 and elastic engaging pieces 25 are respectively arranged at equal intervals in the circumferential direction of a pillar portion 23 (see FIG. 13). In the clip 10 of the above-described embodiment, given trimming grooves are provided between the elastic engaging pieces 25 and the pillar portion 23. In the clip 10a of this embodiment, a below-described structure is employed in view of simplifying a die structure for forming the clip.

Figure 11A:
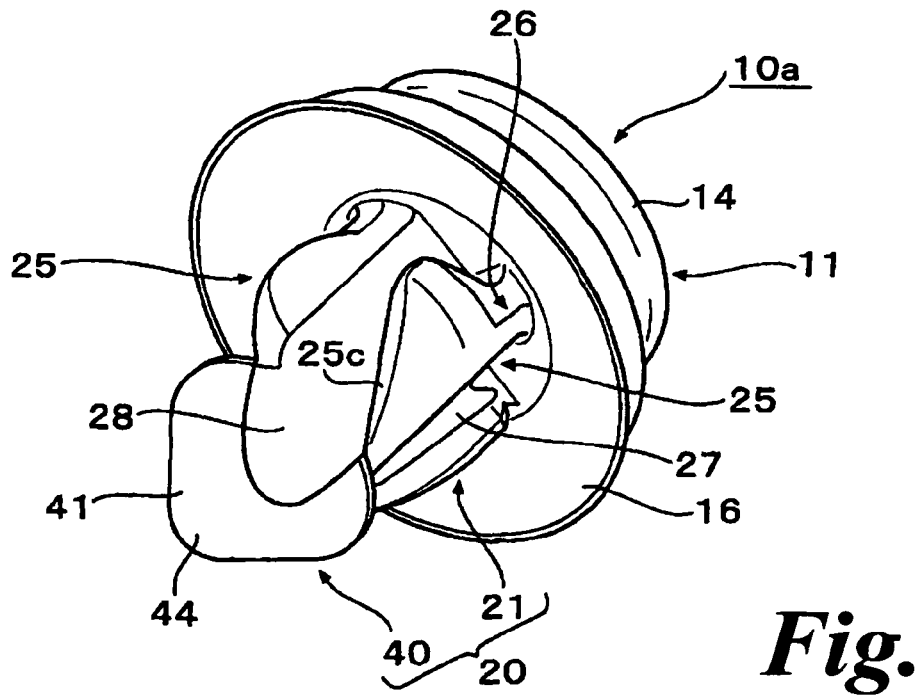
FIGS. 11A and 11B show another embodiment of a clip of the present invention.
Figure 11B:
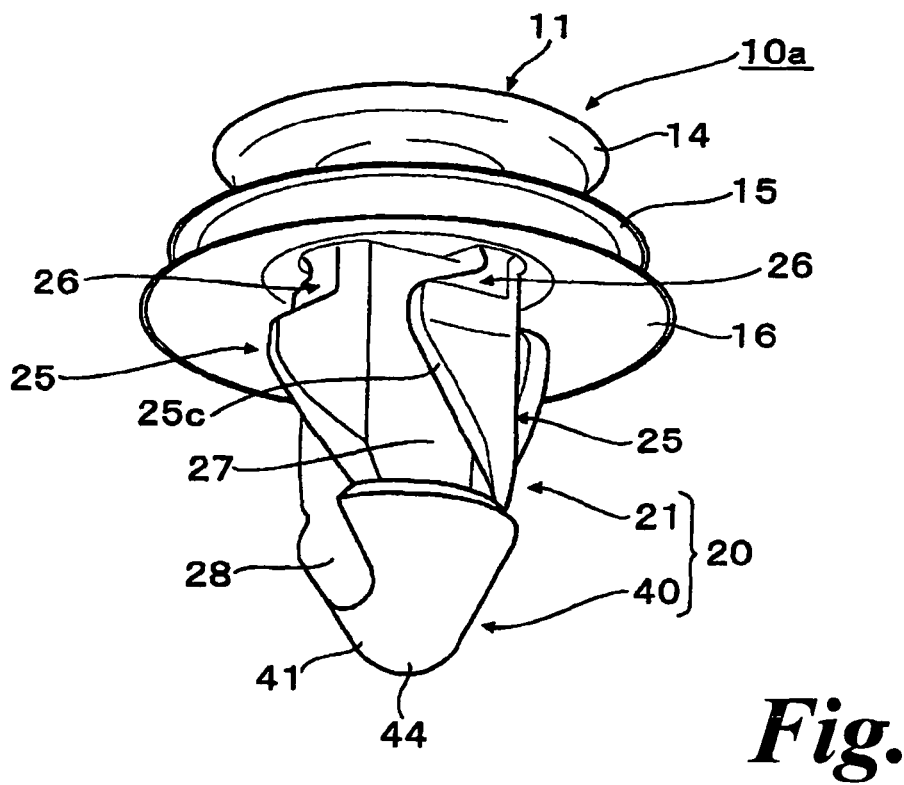
Figure 12A:
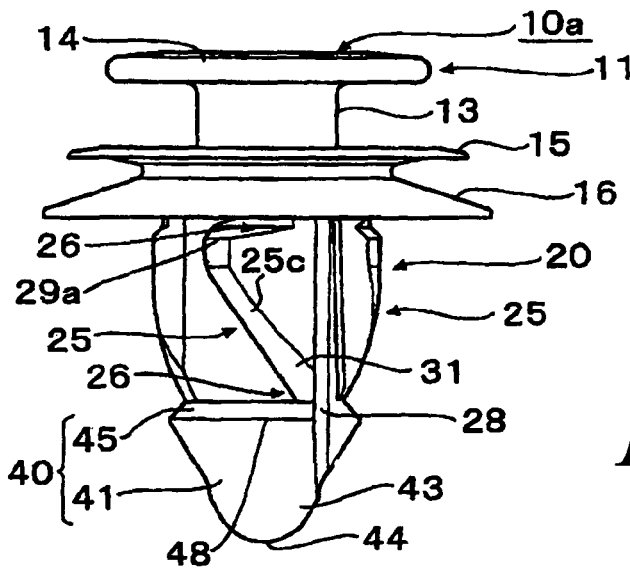
FIGS. 12A, 12B and 12C show the clip.
Figure 12B:
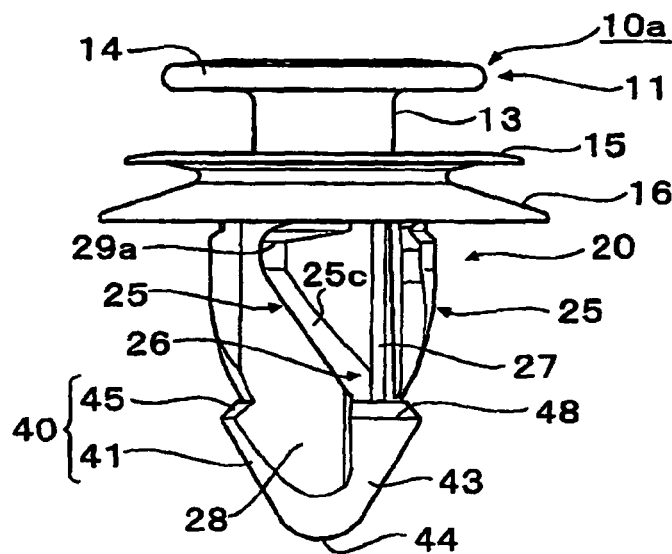
Figure 12C:
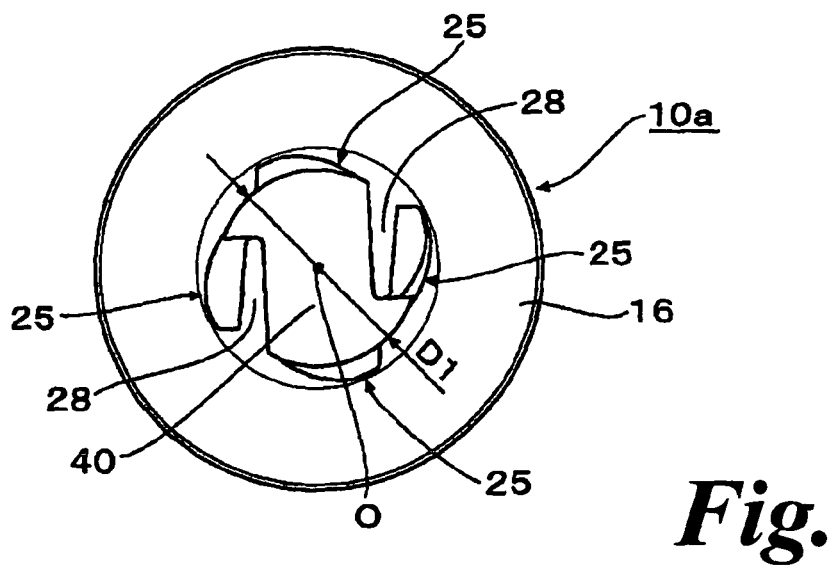

Namely, between pair of elastic engaging pieces 25 and 25 of the four elastic engaging pieces 25 arranged at equal intervals in the circumferential direction of the pillar portion 23 that are opposed to each other in the circumferential direction and the pillar portion 23, one pair of side trimming grooves 27 and 27 are formed that are cut in the directions at right angles to the axial direction of the pillar portion 23 (see FIGS. 11B, 12B and 13).

On the other hand, as shown in FIGS. 11A and 11B, 12A to 12C and 13, between the other pair of elastic engaging pieces 25 and 25 opposed to each other in the circumferential direction and the pillar portion 23, one pair of axial trimming grooves 28 and 28 are formed that partly cut out a guide part 40, and are cut in the axial direction of the pillar portion 23 and opened to side parts.

In the clip 10a of this embodiment, as shown in FIG. 13, the pair of side trimming grooves 27 and the pair of axial trimming grooves 28 are arranged at right angles to each other correspondingly to the four elastic engaging pieces 25 arranged at equal intervals in the circumferential direction of the pillar portion 23. Further, the four elastic engaging pieces 25 are respectively flexibly bent in diametrical directions by the pair of side trimming grooves 27 and the pair of axial trimming grooves 28.

The elastic engaging pieces 25 are formed so that extension amount of the outer edge parts 25c from the ribs 24 is reduced toward the side nearer to the guide part 40. That is, the outer edge parts 25c are formed in oblique line shapes that come the nearer to the ribs 24 as they come nearer to the guide part 40. The outer edge parts 25c are formed to be continuous with opening edge of the axial trimming grooves 28 at an axial position where the reversely tapered part 46 becomes a minimum diameter.

In this embodiment, the guide part 40 is cut out by the pair of axial trimming grooves 28 and 28. The maximum outside diameter D1 of a diameter enlarged part 48 of the guide part 40 in the embodiment means a dimension of the largest outside diameter of the diameter enlarged part 48 including the axial trimming grooves 28 and 28 with respect to a center O (see FIG. 12C).

The clip 10a having the above-described structure can be produced by, for instance, a below-described molding die. As shown in FIG. 13, the molding die includes a pair of split dies 50 and 50 sliding in a direction at right angles to the axial direction of the pillar portion 23 and along the extending directions of the pair of side trimming grooves 27 and 27 (see arrow marks F1 and F2) and a pair of trimming dies 51 and 51 sliding in the axial direction of the pillar portion 23 (see arrow marks F3) so as to trim along the length direction of the pair of axial trimming grooves 28 and 28.

By the pair of split dies 50 and 50, the outer shapes of the four elastic engaging pieces 25, an outer shape of a head portion 11, the inner shapes of the pair of elastic engaging pieces 25 and 25 opposed to each other in the circumferential direction and the guide part 40 are formed. On the other hand, by the pair of trimming dies 51 and 51, the inner shapes of the other pair of elastic engaging pieces 25 and 25 are formed. The upper surface of the head part 11 is formed by other slide die not shown in the drawings.

Then, when the clip 10a is formed, after the pair of split dies 50 and 50 are closed by sliding to come near to each other and the pair of trimming dies 51 and 51 and other slide die not shown in the drawings are slid and set at given positions, a synthetic resin is injected and molded in the cavities of the dies to injection mold the clip 10a.

As described above, the pair of side trimming grooves 27 and 27 are formed by the split dies 50 and 50 sliding in the directions at right angles to the axial direction of the pillar portion 23, so that the inner shapes of the pair of elastic engaging pieces 25 and 25 and the outer shapes of the four elastic engaging pieces 25 can be formed. The pair of axial trimming grooves 28 and 28 are formed by the trimming dies 51 and 51 sliding in the axial direction of the pillar portion 23, so that the inner shapes of the other pair of elastic engaging pieces 25 and 25 can be formed. Accordingly, the structure of the molding die can be simplified.

In the clip shown in FIGS. 1 to 10B in which the axial trimming grooves 28 and 28 cutting out the guide groove 40 are not provided, since four slide dies are respectively necessary for forming trimming grooves between the pillar portion 23 and the four elastic engaging pieces 25, the number of dies is increased.

Figure 14A:
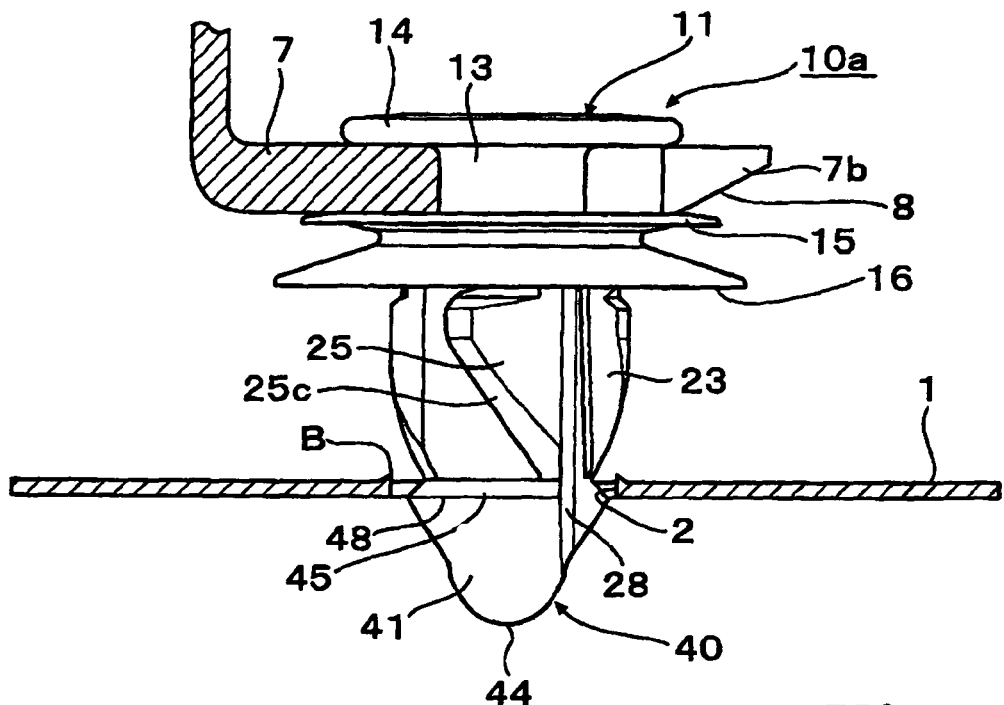
FIGS. 14A and 14B show the using state of the clip.
Figure 14B:
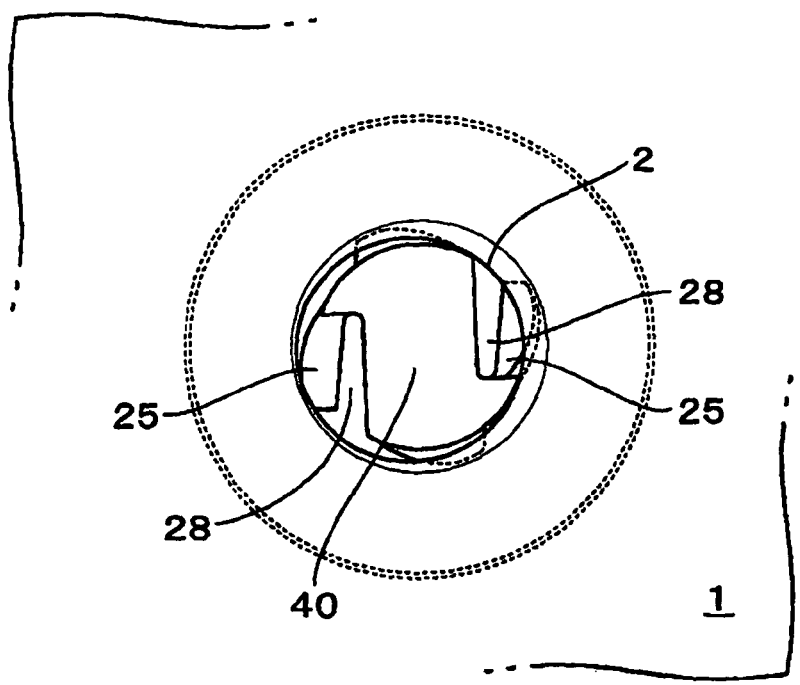

The clip 10a having the above-described structure shown in FIGS. 11A to 14B exhibits the same operational effects as those of the above-described embodiment. That is, after the clip 10a is attached to a trim board 3 through an attaching seat 5, as shown in FIGS. 14A and 14B, a leg portion 20 is inserted into an attaching hole 2 from the front side of the attaching hole 2 of a vehicle body panel 1. At this time, even when burs B exist in the peripheral edge of the attaching hole 2, a tapered part 43 of the guide part 40 whose diameter is reduced gradually toward an inserting direction of the guide part 40 is not bitten, nor caught by the burs B and the leg portion 20 can be smoothly inserted into the attaching hole 2.

Further, in this embodiment, the guide part 40 is partly cut out by the pair of axial trimming grooves 28 and 28, however, other parts are not cut out. Thus, cut out parts required as little as possible are provided. Accordingly, even when the leg portion 20 is inserted into the attaching hole 2 having the burs B, the leg portion 20 is restrained from being caught by the burs B and a protecting function of the end part of an engaging part 21 is prevented from being deteriorated.

Namely, the guide part 40 in this embodiment is partly cut out by the axial trimming grooves 28, however, other parts are solid. Since the solid parts have contact areas larger than those of the cut out parts relative to the attaching hole 2, when the leg portion 20 is pushed into the attaching hole 2, other solid parts than the cut out parts slide in contact with and are pushed into the inner periphery of the attaching hole 2. Thus, the cut out parts are not hooked on the attaching hole 2 and the clip 10a can be smoothly pushed into the attaching hole 2.

The elastic engaging pieces 25 are formed so that extension amount of the outer edge parts 25c from the ribs 24 are gradually reduced toward the guide part 40. That is, the outer edge parts 25c of the end sides of the elastic engaging pieces 25 are formed in oblique line shapes that come the nearer to the ribs 24 as they come nearer to the guide part 40. The outer edge parts 25c are formed to be continuous with opening edge of the axial trimming grooves 28 and with a part of the reversely tapered part 46 where the reversely tapered part 46 becomes a minimum diameter. Accordingly, even when the burs in the peripheral edge of the attaching hole 2 are inserted into the parts of the axial trimming grooves, the burs hardly come into contact with the elastic engaging pieces. Even If the burs come into contact with the elastic engaging pieces, the burs are slid by the oblique lines so that the elastic engaging pieces can be hardly damaged.

According to the clip of the embodiments, when the end-side guide part of the leg portion is initially inserted into the attaching hole, and then, the diameter enlarged part of the leg portion passes through the attaching hole, the end part of the engaging part does not butt against the attaching hole and the leg portion is inserted deeply into the attaching hole via the end part of the engaging part, so that the end part of the engaging part and the part therearound can be protected from being damaged or lost. As a result, for instance, when the engaging part is provided with the elastic engaging pieces capable of being flexibly bent, the bending force or the elastic restoring force of the elastic engaging pieces can be maintained and the securing force of the engaging part to the attaching hole can be held.

Further, since the reversely tapered part having a diameter gradually reduced toward the opposite direction to the inserting direction of the leg portion is provided in the base side of the guide part, when the clip fixed to the attaching hole is detached from the attaching hole because of some reason, the guide part is not caught by the attaching hole and the leg portion can be smoothly pulled out so that the clip can be easily detached from the attaching hole.

What is claimed is:

1. A clip comprising:
   a flange configured to abut a panel having an attaching hole from a front side thereof; and
   a leg portion configured to extend from one surface of the flange so as to be inserted into the attaching hole,
   wherein the leg portion includes:
      an engaging part configured to engage with a back side of the panel; and
      a guide part connected to a distal end of the engaging part,
   wherein the guide part includes:
      a tapered part formed at a distal end thereof so as to be gradually reduced in an outer diameter toward an inserting direction of the leg portion;
      a reversely tapered part formed at a base end thereof so as to be gradually reduced in an outer diameter toward an opposite direction of the inserting direction; and
      a diameter enlarged part formed between the reversely tapered part and the tapered part so as to have an outer diameter largest among the guide part,
   wherein a largest outer diameter of the engaging part is larger than a diameter of the attaching hole,
   wherein the largest outer diameter of the diameter enlarged part is formed to be larger than an outer diameter of a distal end part of the engaging part and to be smaller than the diameter of the attaching hole, and
   wherein the largest diameter of the engaging part is larger than the largest outer diameter of the diameter enlarged part of the guide part.

2. The clip according to claim 1,
   wherein Y>X/3 is satisfied, where X is an axial distance from a base end part of the guide part to a position where an outer diameter of the engaging part becomes largest, and Y is an axial distance from the base end part of the guide part to a position where an outer diameter of the engaging part becomes equal to the largest outer diameter of the diameter enlarged part.

3. The clip according to claim 1, wherein the guide part is formed to be solid.

4. The clip according to claim 1,
   wherein the engaging part includes:
      a post extending from a center of the one surface of the flange;
      a plurality of ribs radial-outwardly extending from outer peripheries of the post; and
      a plurality of elastic engaging pieces circumferentially extending from ends of the ribs so as to be engaged with the back side of the panel.

5. The clip according to claim 4, wherein four ribs of the plurality of ribs and four elastic engaging pieces of the plurality of elastic engaging pieces are formed on the post so as to be respectively arranged at equal intervals in a circumferential direction of the post,
   wherein a pair of side trimming grooves are formed between the post and each of one opposing pair of the elastic engaging pieces,
   wherein a pair of axial trimming grooves are formed between the post and each of the other opposing pair of the elastic engaging pieces and formed to extend through the guide part along an axial direction of the post, the axial trimming grooves being flattened out at the guide portion, and
   wherein the elastic engaging pieces are flexibly bendable in a radial direction through the trimming grooves.

6. The clip according to claim 5,
   wherein the elastic engaging piece is formed so that an extension amount of an outer edge part thereof from the rib is reduced toward the guide part.

7. The clip according to claim 6,
   wherein the outer edge part is formed to be continuous with a fattened out portion of the axial trimming groove at an axial position where the outer diameter of the reversely tapered part becomes minimum.

8. The clip according to claim 4, wherein the plurality of elastic engaging pieces extend from the ends of the plurality of ribs, respectively, in the circumferential direction of the post.

9. The clip according to claim 4, wherein an elastic engaging piece of the plurality of elastic engaging pieces connects to a radially outward end of a rib of the plurality of ribs and extends in a circumferential direction of the post away from the radially outward end of the rib.

10. The clip according to claim 1, wherein a radially outward tapered surface of the leg portion extends circumferentially around the leg portion as the radially outward surface of the tapered surface approaches the guide part.

11. The clip according to claim 4, wherein plural grooves are formed between adjacent elastic engaging pieces of the plurality of elastic engaging pieces.

12. The clip according to claim 11, wherein the plural grooves extend in a circumferential direction around the post as the plural grooves extend from the guide part toward the flange such that the plural grooves form a spiral shape.

13. The clip according to claim 9, wherein, as viewed from an axis direction of the post, a distal end of each elastic engaging piece in an extending direction extends beyond an outer periphery of the guide part, while a base end thereof does not extend beyond the outer periphery of the guide part.

14. The clip according to claim 4, wherein extending directions of the plurality of elastic engaging pieces are substantially aligned in a same circumferential direction.

15. The clip according to claim 4, wherein extending directions of the plurality of elastic engaging pieces are substantially aligned along a same circumference.

16. The clip according to claim 1, wherein the reversely tapered part comprises a partial cone shape.

17. The clip according to claim 1, wherein the reversely tapered part is adjacent to the engaging part.

18. The clip according to claim 1, wherein a cross section of the reversely tapered part comprises a circle.

19. The clip according to claim 1, wherein the reversely tapered part extends circumferentially around the guide part.

* * * * *